Nov. 10, 1959 J. P. JONES 2,912,680

NOISE IMMUNE READ-OUT CIRCUIT

Filed March 14, 1957

INVENTOR.
JOHN PAUL JONES

BY

George Baron

ATTORNEY 2,912,680
Patented Nov. 10, 1959

2,912,680

NOISE IMMUNE READ-OUT CIRCUIT

John Paul Jones, Pottstown, Pa., assignor to Burroughs Corporation, Detroit, Mich., a corporation of Michigan Application March 14, 1957, Serial No. 645,950
4 Claims. (Cl. 340—174)

This invention relates to magnetic storage devices, and more particularly to switching circuits employing bistable magnetic elements having substantially square hysteresis loop characteristics.

Magnetic storage elements are used extensively as switching devices in shift register circuits. Such an element exhibits a substantially square hysteresis loop characteristic and has the capacity of being driven toward either of its two magnetic saturation states depending upon the polarity of the magnetomotive force being applied to it. The element will relax to and remain in its corresponding magnetic remanent state when the magnetomotive force is removed. In general, the bistable magnetic element is in the shape of a toroidal core, but it is not necessary that the storage element be restricted to such geometrical shape. The two states of magnetic remanence provided by a toroidal core enables it to store binary information.

Because of the rectingular hysteresis characteristic of a core, little voltage will be induced in transfer windings wound on such cores by input signals of a polarity tending to establish a saturation polarity corresponding to the remanence condition already existing in the core, but a substantial voltage will be induced in such transfer windings by input signals of a polarity tending to establish a saturation polarity opposite to the remanance condition existing in the core.

Binary information may be entered either in serial or in parallel fashion in a shift register, and such information, once entered, is transmitted serially along the shift register in a conventional manner well known to those skilled in the shift register art. Often it becomes necessary that the last core of a shift register read its information into an output circuit, which output circuit must deliver relatively uniform high voltage pulses to actuate auxiliary equipment used in conjunction with such shift register. A conventional shift register will often rely upon a simple transfer loop to couple a core being read out (called the "transferor" core) with a core into which such read-out information is being transmitted (called the "transferee" core), wherein such transfer loop will comprise an output winding on the transfer core, an input winding on the transferee core, and a diode inserted in the loop between the output winding and input winding.

Relays, thyratrons, and many other electron type circuits which are to be triggered into conduction or operation require moderately high voltage pulses to initiate such operation. Normally, in order to obtain a uniform high voltage pulse in the output circuit coupled to the last core of the shift register so that such shift register may actuate a relay thyratron or other electron type circuit, one of two expedients is resorted to; either the last core is switched very rapidly or a great maney turns are put on the output winding of the last core. Both expedients have been found undesirable; rapid switching of the output core will cause a high back E.M.F. to develop through the transfer loop coupling the last core to the penultimate core of the shift register so as to cause a spurious backward transfer of information to the penultimate core. On the other hand, were the number of turns of the output core increased in order to provide fast core switching and its consequent high voltage to an output utilization circuit connected to such output winding, the interwinding capacity of the output winding would be so high as to cause ringing, such ringing resulting in a reading back of a partial "1" into the very output core that was being switched from its "1" state to its "0" state. Such backward transfer of spurious "1's" produces unwanted noise signals and is obviously undesirable in a computer or associated equipment.

Applicant is able to overcome the drawbacks that exist when too many turns are placed in the output winding of the last core of a shift register or when such last core is switched too rapidly by relying upon a buffer core between the last core of the shift register and an output utilization circuit used in conjunction with such shift register. The last core is loaded with an output transformer core such that the switching time of the last core remains relatively slow and consistent with the switching times of the other cores in the shift register, but the switching time of the output transformer core is fast. The buffer core is made to switch very rapidly while information is being read into it, such read-in interval being the read-out interval for the last core of the shift register. Since the output transformer coupled to the buffer core produces the desirable output to a utilization circuit at the time that the last core is being read-out, there is no spurious transfer of information back through the shift register when the buffer core switches rapidly.

It is an object of the present invention to increase the reliability of magnetic shift registers read-out circuits.

It is a further object to obtain a noise immune high amplitude output circuit for a shift register.

These and other objects and advantages of the invention will become apparent to those skilled in the art or will be specifically described in the detailed description which follows wherein.

Figure 1:
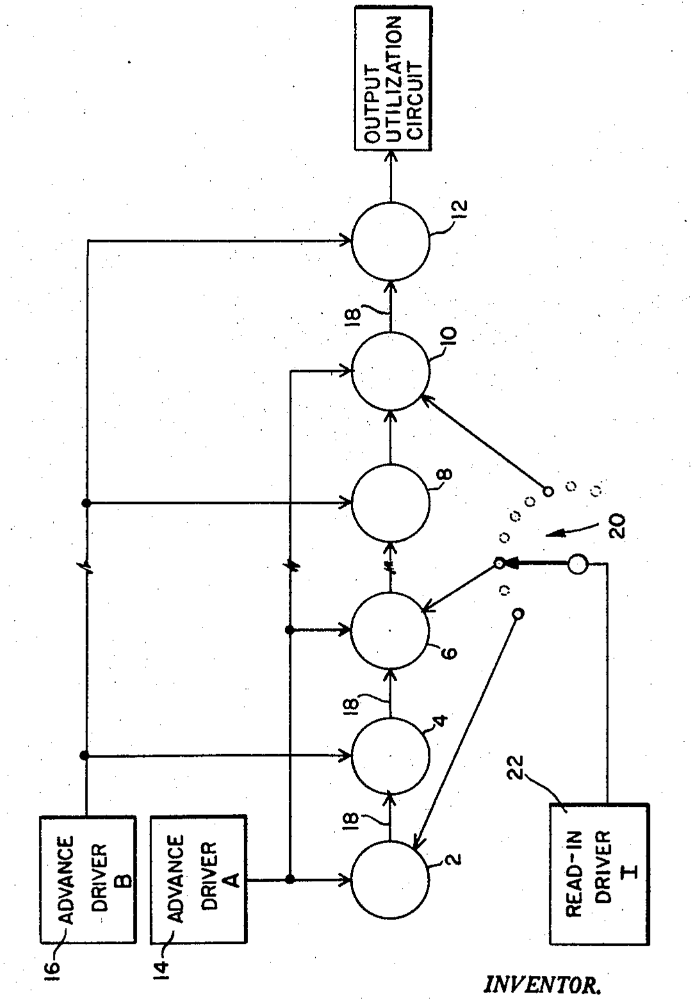
Fig. 1 is a generalized shift register shown in symbolic form.

Turning to Fig. 1 there is shown a magnetic shift register unit comprising a series of bistable magnetic elements, 2, 4, 6, 8, 10, and 12, represented symbolically as circles. An arrow touching the perimeter of a circle indicates to what magnetic state that magnetic element corresponding to such circle is switched when magnetic flux is applied to the magnetic element. Pulse generator 14 and pulse generator 16 represent sources of signal pulses that are applied alternately to the bistable elements so that advancing pulses from pulse generator 14 are applied at time interval $t_0$–$t_1$ to the odd elements 2, 6, 10, etc. and at time interval $t_1$–$t_2$ pulse generator 16 applies signal pulses to the even elements 4, 8, 12, etc. Arrow 18 represents a transfer loop that transmits the output signal from a switched element as an input signal to the next adjacent bistable element. Selector switch 20 determines which element of the shift register will be chosen to receive a bit or unit of information, such bit to be transmited along the shift register in response to advancing signal pulses applied to the cores. When a single bit of information is transmitted along the register and the register is reentered on itself, the register can be considered a cyclic distributor. The switch 20 also provides the number of bits put into the register by choosing the entry point.

Figure 2:
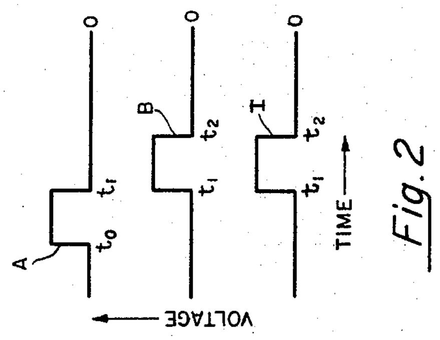
Fig. 2 is a pulse-time diagram for aiding in the understanding of the operation of Fig. 1.

Fig. 2 illustrates the time-relation between an "A" advancing pulse from pulse source 14, an advancing pulse "B" from pulse source 16 and read-in pulse "I" from a suitable source of signal pulses 22. It will be seen that a bit of information "I" may be read into an odd, or A, core of the register at the same time that an even or B core is being actuated since there will be no interaction between the B cores being read-out and the particular A core into which a "1" is being read.

A shift register unit is composed of a plurality of A and B cores, read-out and read-in windings, diodes, and appropriate connecting leads and terminals. If the shift register unit is a 10-bit unit, there will be ten A cores and ten B cores. The cores may be of any desired size and have any number of windings consonant with the size of the core. The base that houses the cores and its corresponding circuitry may be an insulated base made of plastic, Bakelite, resins, or cardboard on which may be printed the circuitry linked with the cores, windings, and diodes. Such plug-in unit has a terminal block, similar to the base of a vacuum tube, with prongs for being plugged into sources of signal pulses such as sources 14, 16, and 22.

Figure 3:
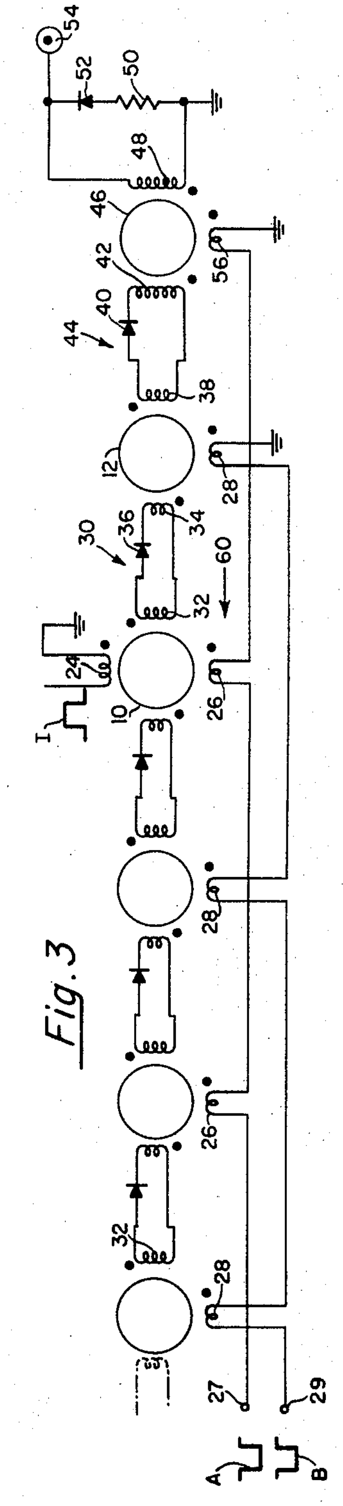
Fig. 3 is an electrical schematic of the invention.

Fig. 3 shows cores 10 and 12 which normally would be the last two cores of a plug-in unit containing a plurality of cores. Winding 24 is an input winding which is coupled to a source "I" of input pulses for reading a "1" into core 10 at any predetermined time. Winding 26 is one of a plurality of sensing or advancing windings that receive "A" signal pulses at input terminal 27 from pulse source 14, and upon such receipt of signal pulses tend to drive the cores coupled to such advancing windings to their respective "0" states and transfer the "1" (if there be a "1") in such cores to adjacent cores. Winding 28 is one of a plurality of B advancing windings that receive "B" signal pulses at input terminal 27 and are similar in function to the A advancing windings, but the former advancing windings are actuated alternately with respect to the latter advancing windings. The simple transfer loop 30 that couples core 10 to core 12 consists of output winding 32 on core 10, an input winding 34 on core 12, and a diode 36. Output winding 38 is wound on core 12 and such winding 38, diode 40, and input winding 42 form another transfer loop 44. Core 46 is a buffer core that has similar characteristics as the other cores in the magnetic shift register. Such buffer core 46 couples its input winding 42 with its output winding 48. Shunting output winding 48 is a resistor 50 and diode 52. Output terminal 54 is fed into an output utilization circuit not shown. Advancing winding 56 is placed in series with the other A windings that receive signal pulses from advance driver source 14.

The operation of Fig. 3 will now be described. In the normal shift register plug-in unit, core 12 would be the last core of the plug-in unit and winding 38 would be the output winding for the plug-in shift register, with transfer loop 30 serving as the last transfer loop of the shift register unit. The normal output voltage pulse taken off the last core of the shift register would appear across the terminals of output winding 38. In certain computer circuits in which the plug-in shift register or cyclical distributor is a component, it is necessary to have a relatively high amplitude voltage pulse across the terminals of output winding 38 in order to obtain dependable operation of computer elements added to such shift register plug-in unit. In order to obtain such high amplitude pulses, either the advance winding turns 28 could be increased to provide more magnetomotive force to make core 12 switch faster, or more turns could be provided on output winding 38. When the former expedient is relied upon, namely, using more ampere-turns for advancing winding 28, the increased speed of switching of core 12 will induce a high "noise" current in transfer loop 30 in the direction of the arrow 60, such high "noise" current tending to read an undesired or spurious "1" into core 10 of the A group of cores. When the latter expedient is relied upon, namely, increasing the number of turns on output winding 38, the interwinding capacitance between turns becomes so high that "ringing" or undesired oscillations take place because the interwind capacity of winding 38 stores and discharges energy. Thus when the advancing B pulse that has sent a current pulse through advancing winding 28 has terminated, the ringing of winding 38 through its utilization circuit will read a spurious "1" back into core 12, when it was the intent of the advancing pulse, upon its termination, to leave core 12 in the "0" state.

When the last core 12 is loaded with an output transformer or buffer core 46 (which need not necessarily have square loop characteristics), the switching time for the last core 12 of the register can remain relatively slow to avoid undesired back flow through loop 30 of noise signals; however, the turns of winding 42 are made relatively large with respect to the other windings 32, 34, 38, etc. of the register. Such increased turns permit buffer core 46 to switch rapidly towards its "1" state and induce the desired high voltage output at the output terminal 54. If buffer core 46 switches rapidly enough, the number of turns in winding 48 need not be especially high. Note, also, that buffer core 46 is made to switch when the last core 12 is sensed or read out, so there is no transfer back through loop 44 of undesired noise signals. If core 46 is a core having a square hysteresis loop, a resetting A pulse is applied to winding 56 at the same time that the A or odd cores are being switched by an advancing A pulse. The resetting of buffer core 46 toward its "0" state looks into two loads, namely, output winding 48 and its load 50 as well as input winding 42. The load of the damping network comprising resistor 50 and diode 52 causes the core 46 to reset slowly, therefore relatively little noise is transmitted back to the last core 12 of the shift register unit through transfer loop 44. Resetting of buffer core 46 induces current flow in winding 48 so that current flows from the dotted terminal of winding 48, through resistor 50, diode 52, and back through winding 48. Consequently the diode 52 and resistor 50 serve to clamp the negative pulses that would appear at the output terminal 54 when buffer core 46 is reset to its "0" state as well as to prevent "ringing" in transformer winding 48. If buffer core 46 does not have a square hysteresis loop, then no resetting winding 56 is necessary, and the values of resistor 50 and diode 52 are chosen to provide ideal or "critical" damping.

Since magnetic shift register plug-in units must be versatile and adaptable for use with various pulse sources, logic units, and other components of a computer, it is not feasible to make adjustments in the completed plug-in unit once it has been assembled. Since it is an object to obtain a noise-free high amplitude output pulse when the last core of a shift register is read-out without the need to modify the other elements of such shift register, the instant invention is able to attain such object simply and efficiently.

What is claimed is:

1. In combination; a two-core-per-bit shift register comprising a plurality of intercoupled magnetic cores each capable of assuming either of two stable states of magnetic remanence, each core except the last being coupled to a succeeding core by a transfer loop comprising an output winding coupled to one core, an input winding coupled to the succeeding core, and a unidirectional current conducting device for permitting current flow in but one direction around the transfer loop; first shift winding means coupled to the first and each other odd-numbered core and connected to receive "A" shift pulses for effecting read-out of the odd-numbered cores and read-in of the even-numbered cores; second shift winding means coupled to the second and each other even-numbered core and connected to receive "B" shift pulses for effecting read-out of said even-numbered cores and read-in of said odd-numbered cores, said "A" and "B" shift pulses occurring alternately; a magnetic core external of the register and coupled to the last even-numbered core of the register by a transfer loop comprising an output winding on said register last even-numbered core, an input winding on said external core, and a unidirectional current conducting device for permitting current flow in but one direction around said transfer loop, said input winding on said external core having a substantially larger number of turns than does the input winding of any register core, whereby said external core switches relatively fast in response to the switching of said register last even-numbered core on read-out; an output winding coupled to said external core and having connected in shunt thereacross a damping circuit comprising in series a resistance and a unidirectional current conducting device, said last-named unidirectional current conducting device being so poled that said damping circuit presents a relatively high impedance to the relatively large voltage developed across said external-core output winding in response to said fast switching of said external core in response to the reading out of said last even-numbered core of the register; and a shift winding coupled to said external core and connected in series with the shift winding means of said odd-numbered cores for resetting said external core at a time when said register last even-numbered core is being read in, said damping circuit presenting a relatively low impedance to the voltage induced in said external-core output winding during reset, whereby said external core switches relatively slowly on reset and a relatively low voltage is induced in its input winding, whereby but a small noise voltage is fed back to said register last even-numbered core.

2. Apparatus as claimed in claim 1 characterized in the provision of a utilization circuit across said damping circuit.

3. In combination; a shift register comprising a plurality of magnetic cores each capable of assuming either of two stable states of magnetic remanence, each core except the last being coupled to a succeeding core of the register by means of a transfer loop, each transfer loop comprising an output winding coupled to one core, an input winding coupled to the succeeding core and a unidirectional current conducting device for permitting current flow around said loop in but one direction; first shift means including shift windings coupled to alternate cores of the register for reading out said alternate cores and reading into the other alternate cores; second shift means including shift windings coupled to said other alternate cores, one of which is the last core of the register, for reading out said other alternate cores and reading into said alternate cores; and a magnetic core external of the register and coupled to said last core of the register by a transfer loop which comprises an output winding on said last core, an input winding on said external core, and a unidirectional current conducting device for permitting current flow around said loop in but one direction, said external-core input winding having a substantially larger number of turns than the input windings of said register cores, whereby when said register last core is switched on read-out by said second shift means, said external core is switched fast in response thereto; an output winding coupled to said external core in which a relatively large voltage is induced in response to said fast switching of said external core in response to the switching of said last core; a damping circuit connected in shunt across said output winding of said external core and comprising in series a unidirectional current conducting device and a resistance, said last-named unidirectional current conducting device being so poled that said damping circuit looks like a high impedance to the voltage induced in said output winding in response to the said fast switching of said external core; and means for resetting said external core substantially concurrently with the read-in of said last core of said register, said damping circuit presenting relatively low impedance to the voltage induced in said external-core output winding on reset, whereby said external core is switched relatively slowly on reset and a relatively small noise voltage is induced in its input winding.

4. Apparatus as claimed in claim 3 characterized in the provision of utilization means connected across said damping circuit.

References Cited in the file of this patent

UNITED STATES PATENTS

| | | |
|---|---|---|
| 2,683,819 | Rey | July 13, 1954 |
| 2,784,390 | Chien | Mar. 5, 1957 |